United States Patent [19]

Miller

[11] 4,106,442

[45] Aug. 15, 1978

[54] DEVICE FOR INCREASING FUEL ECONOMY OF AN INTERNAL COMBUSTION ENGINE

[75] Inventor: Albert J. Miller, Campbell, Calif.

[73] Assignee: Engineering Systems Corporation, Santa Clara, Calif.

[21] Appl. No.: 742,004

[22] Filed: Nov. 15, 1976

[51] Int. Cl.² .................. F02M 23/04; F02M 7/10
[52] U.S. Cl. .................. 123/26; 123/124 R; 123/124 B; 123/119 D; 123/119 DB
[58] Field of Search .............. 123/26, 119 D, 119 DB, 123/124 R, 124 B

[56] References Cited

U.S. PATENT DOCUMENTS

| | | | |
|---|---|---|---|
| 3,738,109 | 6/1973 | Tatsutomi et al. | 123/119 D |
| 3,960,130 | 6/1976 | Peterson, Jr. | 123/124 B |
| 3,977,375 | 8/1976 | Laprade et al. | 123/124 B |
| 4,046,120 | 9/1977 | Laprade et al. | 123/119 D |
| 4,052,968 | 10/1977 | Hattoii et al. | 123/124 B |

*Primary Examiner*—Charles J. Myhre
*Assistant Examiner*—P. S. Lall
*Attorney, Agent, or Firm*—Harris Zimmerman

[57] ABSTRACT

A device for improving the fuel economy of new or existing internal combustion engines includes a vacuum sensing switch connected to the intake manifold of the engine, and a speed-sensing electronic circuit connected to the distributor of the engine. The device also includes a solenoid operated valve interposed between the ambient atmosphere and the positive crankcase ventilation valve normally found in an internal combustion engine. The device includes a computing circuit which operates on the information from the speed sensor and the vacuum switch to actuate the solenoid operated valve when the engine is idling, accelerating, or deaccelerating. The ambient, uncarbureted air introduced through the positive crankcase ventilation valve increases the air-to-fuel ratio within the intake manifold, thereby increasing the efficiency of the engine.

13 Claims, 5 Drawing Figures

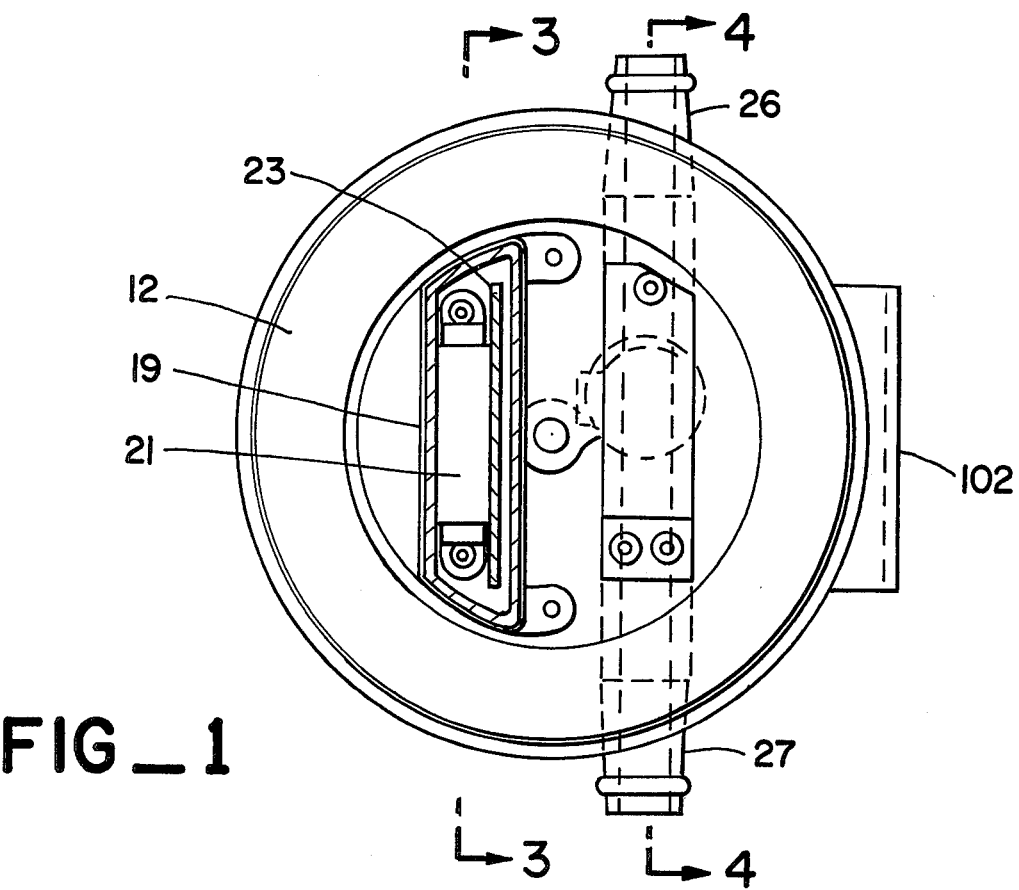
FIG_1
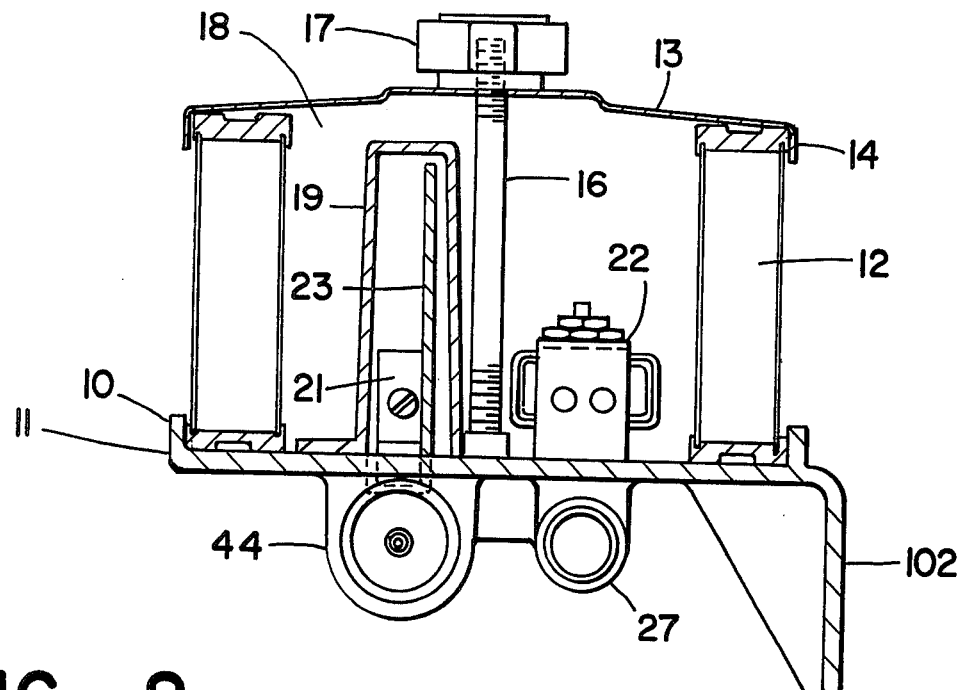
FIG_2

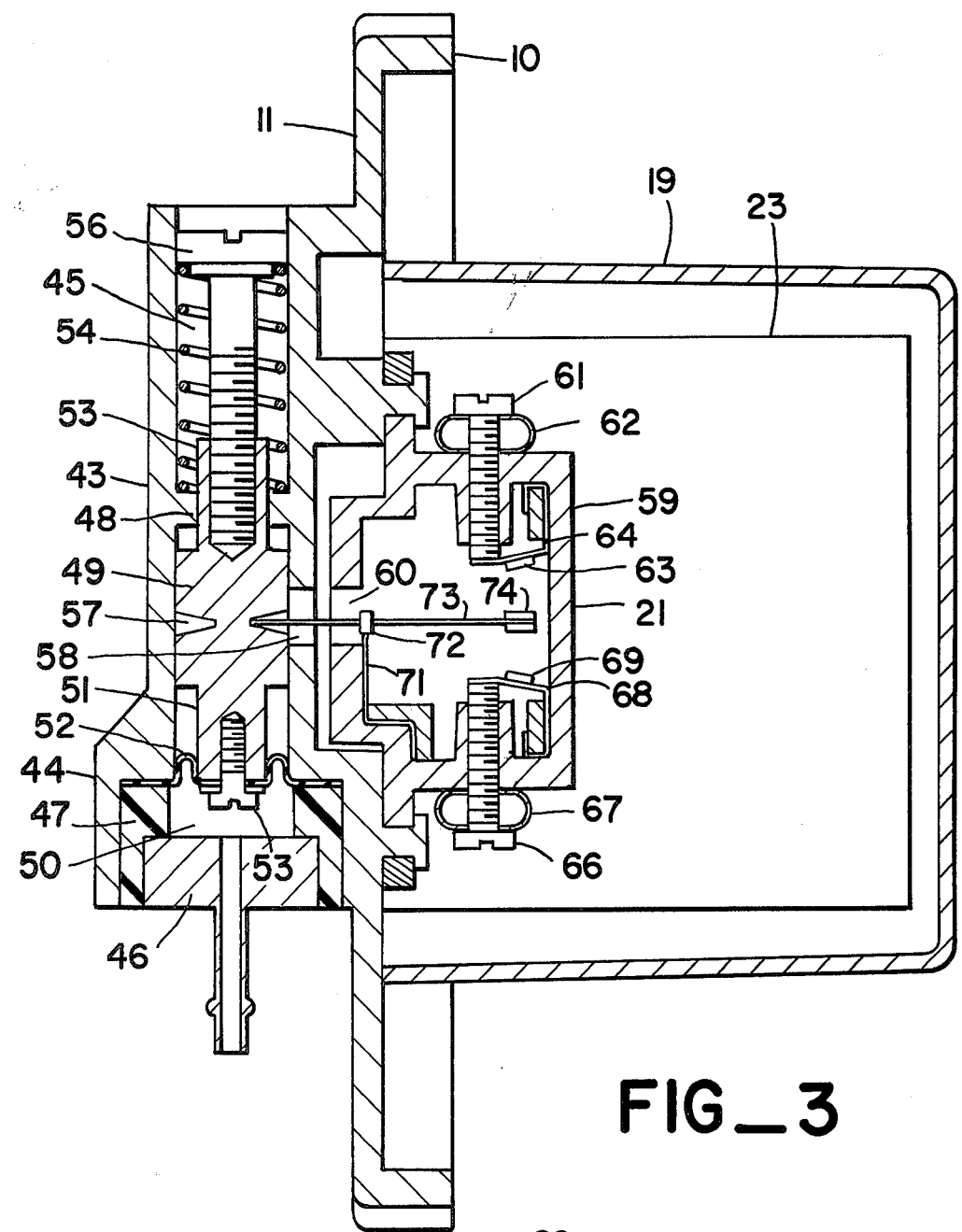
FIG_3
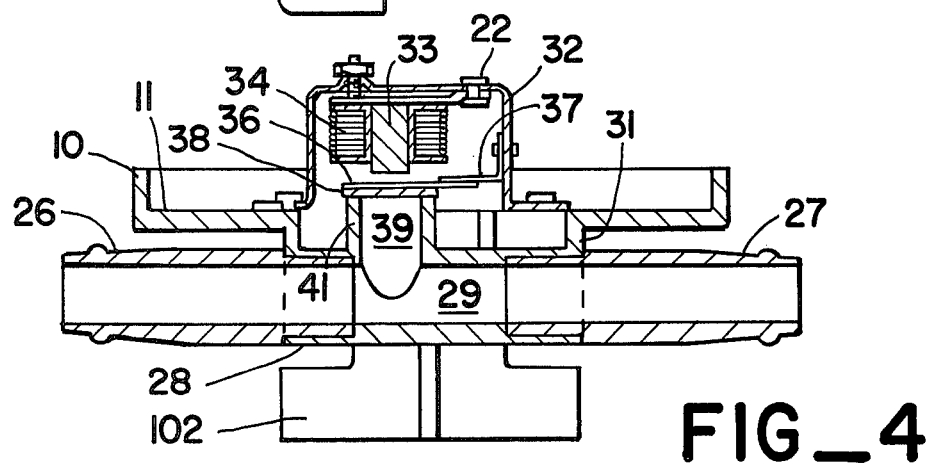
FIG_4

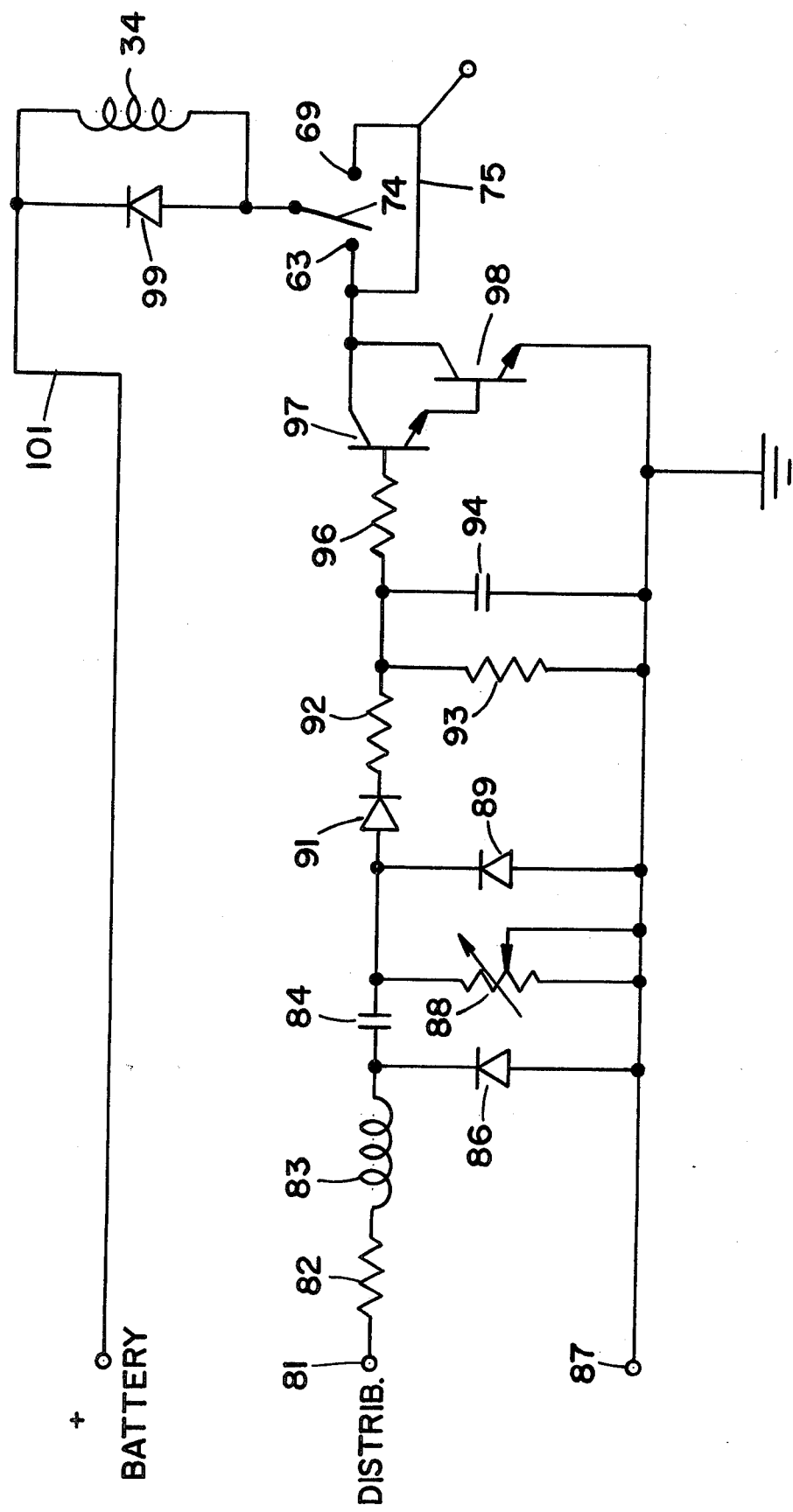
FIG_5

DEVICE FOR INCREASING FUEL ECONOMY OF AN INTERNAL COMBUSTION ENGINE

BACKGROUND OF THE INVENTION

The reciprocating internal combustion engine has undergone many evolutionary changes in the century it has been in existance. One of the aspects of the internal combustion engine which has remained most constant is the popularity of the carburetor for providing the air-fuel mixture to the engine.

The carburetor is inherently a steady-state device, and as such it can be finely tuned for a narrow range of operation. Within this narrow range, it performs optimally and it provides the correct air-fuel mixture. However, when the engine operating range is altered at all in engine speed, temperature, load, or the like, the carburetor becomes a very inefficient device for providing the correct air-fuel mixture for the conditions experienced by the engine.

These inherent defects in the carburetor have been recognized for years by those individuals skilled in the automotive arts. However, cheap fuel prices and a lack of concern for air quality in urban areas mitigated against any severe design changes in the carburetor.

In recent years, fuel prices have increased extraordinarily, and the degradation of air quality due to automotive exhaust emissions has become of vital concern. It has been found that when a carburetor is not operating within its narrow optimum range, it generally provides too much fuel to the internal combustion engine. When this occurs, the engine efficiency is reduced, the exhaust emissions of carbon monoxide, unburned hydrocarbons, and oxides of nitrogen, are increased. These exhaust compounds are the major contributors to the formation of smog in urban areas. The prior art includes recent patents which attempt to improve the performance of the standard carburetor. These patents, which reflect the state of the art, are the following: U.S. Pat. Nos. 3,868,933; 3,866,588; 3,738,109; 3,688,752; 3,599,426; and 3,533,386.

These patents generally relate to devices for introducing uncarbureted air into the intake manifold of the engine to improve the air-fuel ratio of the carbureted air during particular engine operating conditions. These conditions are sensed by manifold vacuum sensors, engine temperature sensors, and the like. The major drawback of these devices is that they do not respond correctly to the various combinations of engine operating parameters.

SUMMARY OF THE INVENTION

The present invention generally comprises a device for increasing the fuel economy of an internal combustion engine by introducing uncarbureted air into the intake manifold of the engine during predetermined engine operating conditions. The uncarbureted air is introduced only at times when a lean air-fuel mixture will not adversely affect the operation of the engine.

The device includes a housing which is adapted to be secured at any convenient location within the engine compartment. Within the housing is disposed a solenoid operated valve. Secured to the housing is an air filter which provides clean air to the solenoid operated valve. The valve is interposed in a positive crankcase ventilation line normally found in an internal combustion engine. An electronic computing circuit selectively operates the valve to introduce filtered air into the PCV line, which in turn feeds the filtered air into the intake manifold of the engine. Also disposed within the housing is a single pole double throw vacuum sensing switch, which is connected to the carburetor vacuum. The vacuum sensing switch senses high and low vacuum conditions in the carburetor, and furnishes this information to the electronic circuit in the device.

The electronic circuit also includes a tachometer sensing portion which is connected to the distributor of the engine. The electronic circuitry integrates the information concerning the speed of the engine and the state of the vacuum in the carburetor of the engine, and determines the intervals during which uncarbureted air can be admitted to the intake manifold to increase the engine efficiency without adversely affecting its performance.

BRIEF DESCRIPTION OF THE DRAWINGS

FIG. 1 is a plan view of the fuel economizing device of the present invention.

FIG. 2 is a side elevation of the fuel economizing device of the present invention.

FIG. 3 is a cross-sectional view taken along line 3—3 of FIG. 1.

FIG. 4 is a cross-sectional view taken along line 4—4 of FIG. 1.

FIG. 5 is a schematic representation of the electronic circuitry of the present invention.

DESCRIPTION OF THE PREFERRED EMBODIMENT

With reference to FIGS. 1 and 2, the preferred embodiment of the present invention includes a base member 11 which supports a cylindrical air filter 12. The base member 11 includes an annular flange 10 which retains the filter and seals the lower end thereof, and a top plate 13 having an annular flange 14 retains and seals the top end of the filter. A threaded post 16 extends axially upwardly from the base member through the top plate, and a knurled nut 17 engages the threads of the post. The nut 17 applies compression to the top plate to secure the top plate and filter to the base member.

The air filter 12, top plate 13, and base member 11 define an interior chamber 18. Within the chamber 18 are disposed the major components of the invention: the vacuum switch assembly 21 and the printed circuit board 23, both disposed within a case 19 sealingly joined to the base member, and a solenoid actuated valve assembly 22, also secured to the base member.

The solenoid actuated valve assembly 22, shown in detail in FIG. 4, includes a stepped recess 31 in the base member 11. Extending downwardly from the recess 31 is a housing 28 which is provided with a cylindrical passage 29 extending axially therethrough. A pair of nipples 26 and 27 adapted for securing standard air hoses are secured in sealing fashion in the opposed ends of the passage 29.

Disposed directly superjacent to the recess 31 is an open solenoid bracket 32. The solenoid bracket supports the pole piece 33 and coil 34 thereabout of an electromagnet. Aligned axially with the pole piece is a tubular member 41 which defines a passageway 39 interconnecting the passageway 29 with the chamber 18 within the air filter. A leaf spring 37 is secured to one side of the bracket 32, and a ferromagnetic clapper is joined to the distal end of the spring immediately adjacent to the pole 33 and the orifice of the passageway 39.

A layer of sealing material 38 is secured to the lower surface of the clapper to provide an airtight seal with the orifice of the passageway 39.

Modern internal combustion engines are provided with a positive crankcase ventilation system (PVC), which vents the crankcase fumes through a flexible hose which is connected to the intake manifold of the engine. In conjunction with the present invention, the flexible hose is cut, one cut end being secured to one of the nipples 26 or 27, and the other cut end being secured to the other nipple. It may be appreciated that the passage 29 is thus connected to the partial vacuum present in the intake manifold. This vacuum creates a pressure differential across the seal 38 which tends to sustain the seal of the orifice of the passageway 39.

Whenever the electromagnet is actuated, the clapper is pulled to impinge on the pole piece, thus opening the passageway 39 to ambient air pressure. Thus ambient, uncarbureted air, which is drawn through the air filter 12, is admitted to the passage 29 and thence to the intake manifold.

The vacuum switch assembly 21, shown in detail in FIG. 3, includes a cylindrical housing 43 extending chordally subjacent to the base member 11. A bore 45 extends axially through the housing 43. One end of the housing 43 is provided with an enlarged shoulder portion 44, and a counterbore 50 within the shoulder 44 communicates with the bore 45. A standard vacuum plug connector 46 is seated within an annular gasket 47, which in turn is resiliently and sealinging secured in the counterbore.

Slidably disposed within the bore 45 is a piston 49, which includes a neck 51 extending toward the counterbore 50. A circular rolling diaphragm seal 52 is secured to the distal end of the neck 51 by means of a screw 53 received therein. The peripheral portion of the diaphragm is secured in sealing fashion between the interior end of the counterbore and the sealing gasket 47 disposed therein.

The bore 45 includes a reduced diameter annular shoulder 48 disposed medially with respect to the axial extent of the bore. An interior neck 53 extends axially from the piston 49 through the orifice defined by the shoulder 48, the neck being freely slidable through the orifice. An adjusting screw 56 is received in the end of the neck 53, and a helical spring 54 is situated about the shank of the screw 56 with the ends of the spring impinging on the screw head and the shoulder 48.

The vacuum switch assembly includes a switch case 59 which is joined to the base member 11 adjacent to the housing 43. An aperture 58 in the base member is aligned with a similar aperture 60 in the switch case, so that open communication is provided between the interior of the switch case and the bore 45. The piston 49 is provided with an annular groove 57 which is disposed generally adjacent to the aperture 58.

Threadedly secured in opposed sides of the switch case are a pair of screws, a high vacuum adjusting screw 61 and a low vacuum adjusting screw 66. Each screw is maintained in place by a locking spring 62 and 67, respectively. Secured to the interior surface of the switch case is a resilient contact 64, which has a free end impinging on the interior end of the screw 61. The contact is provided with a contact tip 63 of brass or similar material known in the art. A resilient contact 68 is secured to the interior of the case 59, in similar relationship to the adjusting screw 66, and it is provided with a contact tip 69.

The switch assembly also includes a switch arm 71 joined to the interior of the case 59, the distal end of the switch arm being formed as a pivot 72, which is adjacent to the aperture 60. The switch counterpole 73 is received in pivotting conducting fashion in the pivot 72, with one end of the centerpole engaging the groove 57 of the piston. A pair of contact tips 74 are joined to the other end of the centerpole. It may be appreciated that the contact tips 63 and 69 are generally aligned so that the contact tips 74 will impinge in flush contact.

The engine manifold vacuum is connected to the plug 46 through a vacuum line extending from the plug to the intake manifold or carburetor. A pressure differential occurs across the diaphragm 52, as the bore side of the diaphragm is vented to the atmosphere. This pressure differential tends to urge the piston toward the counterbore, while the force of the compressed spring 54 acts against the pressure differential.

As the manifold vacuum varies, the dynamic equilibrium of the spring force and the pressure differential changes, causing the piston 49 to translate in the bore. The centerpole 73 is driven by the translating piston to rotate about the pivot 72. High vacuum conditions cause the piston to compress the spring 54 and rotate the counterpole to the extent that the contact tips 74 impinge on the tips 64, completing a circuit therebetween. Conversely, low vacuum conditions close the contact tips 69 and 74 to complete a circuit therebetween. The adjustment screw 56 permits the adjustment of the spring tension of spring 54 so that at engine idle vacuum conditions the contact tips 74 are disposed medially with respect to the contact tips 63 and 69. The screws 61 and 66 permit fine adjustment of the contact closure during high and low vacuum conditions.

The electronic circuitry of the present invention which is shown schematically in FIG. 5, is embodied on the circuit board 23. It includes a terminal 81 which is connected to the distributor of the engine, and also to a resistor 82. The other side of the resistor is connected to an inductor 83, which in turn is connected to a parallel combination of the cathode of diode 86 and a capacitor 84. The anode of the diode 86 is connected to terminal 87, which is grounded.

The other side of the capacitor 84 is connected to the parallel combination of a rheostat 88 and the cathode of diode 89. The anode of diode 89, as well as the other side of the rheostat 88 are connected to ground. The other side of capacitor 84 is also connected to the series combination of forward biased diode 91 and resistor 92. The resistor 92 is connected to the parallel combination of resistor 93 and capacitor 94, and to resistor 96. A Darlington transistor pair 97 and 98 are also provided, the base being connected to the resistor 96.

The collectors of transistors 97 and 98 are connected to both contact tips 63 and 69 of the vacuum switch by means of common wire 75. The centerpole of the vacuum switch is connected to a parallel combination of the solenoid coil 34 and transient defeating diode 99. The other sides of the diode and solenoid coil are connected through conductor 101 to the vehicle battery.

Whenever the engine distributor contacts close, a voltage pulse is applied to the inductor 83 through the limiting resistor 82. As each pulse terminates, the inductor creates a voltage transient, while the positive portion is applied to the capacitor 84. The capacitor 84 and the variable resistor 88 form an RC timing circuit, which smooths the transient pulses appearing there-across. Diode 89 clamps the negative edge of the transient pulses to ground.

The average positive DC value of the waveform passing through resistor 92 is proportional to the number of pulses appearing per unit time, and hence is proportional to the speed of the engine. The network of resistor 93, capacitor 94, and resistor 96 form an RC charging network which is charged to the average positive DC value of the waveform. Whenever the voltage across capacitor 94 reaches a sufficient level, the Darlington pair will turn conductive. This sufficient, or minimum, level corresponds to a minimum engine speed, and is adjustable by means of the variable resistance 88.

Whenever the transistors are conductive, the contacts 63 and 69 are connected directly to ground. Should a high or low vacuum condition exist in the manifold, the switch centerpole will be contacting one of the contacts 63 or 69, and the solenoid coil will be grounded. In this situation the solenoid will be actuated, and the device will admit uncarbureted air into the intake manifold.

Thus the circuitry permits the device to operate only when the engine is rotating above a predetermined minimum such as the standard idle speed for a particular engine. Also, the vacuum switch will permit the device to operate only when the manifold vacuum is very high or very low. The combined effect of these operating parameters is that uncarbureted air will be admitted to the intake manifold whenever the engine is accelerating from idle to full speed, and whenever it is deaccelerating from full speed to a slower speed. In neither situation is there any pronounced effect on the engine performance.

With reference to FIGS. 2 and 4, the base member 11 is provided with an integrally formed bracket 102 which is provided with mounting holes (not shown) for securing the device inside an engine compartment. To connect the invention operatively to the engine, the engine PVC line is cut, and the cut ends are secured to the nipples 26 and 27. Also, the vacuum connector plug 46 is joined to the carburetor or manifold vacuum through standard vacuum tubing. Also, the battery, distributor, and ground connections for the circuitry are made. It is then necessary only to adjust screw 56 and resistor 88 for the idle conditions of the particular engine, and the device is set for operation. This installation is quite simple, and can be accomplished by any home mechanic.

I claim:

1. A device for improving the fuel economy of an internal combustion engine which includes an intake manifold supplying a combustible air-fuel mixture and an ignition system, comprising air filter means for providing clean, uncarbureted air, and means for introducing said uncarbureted air into said intake manifold when said engine is operating above a predetermined speed and is undergoing deacceleration or substantially open throttle full acceleration, said uncarbureted air inreasing the air-fuel ratio in said intake manifold and decreasing the rate of consumption of fuel; said last mentioned means including a vacuum sensing electrical switch connected to said intake manifold, said switch including switch contacts closable by high and low vacuum conditions in said intake manifold corresponding to said deacceleration and said full acceleration, respectively, of said engine; solenoid actuated valve means connected between air filter means and said intake manifold for selectively admitting said uncarbureted air into said intake manifold; electronic circuit means connected to said ignition system for producing an actuating signal when said engine is operating above said predetermined speed, and electronic switching means connected to said solenoid actuated valve means and said switch contacts for operating said valve means when receiving said actuating signal and said switch contacts are closed.

2. The device of claim 1, wherein said switch contacts are adjustable to be closed upon predetermined high or low vacuum conditions.

3. A device for improving the fuel economy of an internal combustion engine which includes an intake manifold, an ignition system, and a positive crankcase ventilation line, comprising air filter means for providing clean, uncarbureted air; solenoid actuated valve means connected between said air filter means and said intake manifold for introducing air therein; vacuum sensing switch means connected to said intake manifold to sense predetermined high and low vacuum conditions in said intake manifold corresponding to deacceleration and full acceleration of said engine; electronic circuit means connected to said ignition system for generating an actuating voltage when said engine is operating above a predetermined speed; and switching means connected to said vacuum sensing switch means, said solenoid actuated valve means, and said electronic circuit means for operating said solenoid actuated valve means when receiving said actuating voltage simultaneously with said vacuum sensing switch being closed by either said predetermined high or low vacuum conditions in said intake manifold; said vacuum sensing switch means including a bore, a piston slidably disposed in said bore, diaphragm sealing means secured to one end of said bore and one end of said piston, said intake manifold being connected in sealing fashion to said one end of said bore, and double throw center pole switch contacts operated by said piston.

4. The device of claim 3, wherein said solenoid actuated valve means includes a flow channel interposed in the positive crankcase ventilation line of said engine, and a solenoid valve selectively opening said air filter means to flow communications with said channel.

5. The device of claim 3, wherein said air filter means includes a generally cylindrical air filter, and further including a base member and top member for supporting said air filter therebetween in sealed fashion, and wherein said solenoid actuated valve means, said vacuum sensing switch means, and said electronic circuit means are housed in a chamber defined by said air filter and said base and top members.

6. The device of claim 3, wherein said piston includes an annular groove disposed medially therein, and said switch center pole contact engages said annular groove.

7. The device of claim 6, wherein said switch center pole is supported at a medial disposition by a pivot, one end of said centerpole engaging said annular groove and the other end engaging said double throw switch contacts.

8. The device of claim 3, further including an adjusting screw extending axially from the other end of said piston, and resilient means impinging on said adjusting screw for axially biasing said piston.

9. The device of claim 3, wherein said double throw contacts are connected together, and said relay means comprises a pair of transistors connected in Darlington configuration, the collectors of said transistors being connected to said double-throw contacts.

10. The device of claim 9, wherein said switch center pole is connected to said solenoid actuated valve means.

11. A device for improving the fuel economy of an internal combustion engine which includes an intake manifold, an ignition system, and a positive crankcase ventilation line, comprising air filter means for providing clean, uncarbureted air; solenoid actuated valve means connected between said air filter means and said intake manifold for introducing air therein; vacuum sensing switch means connected to said intake manifold to sense predetermined high and low vacuum conditions in said intake manifold corresponding to deacceleration and full acceleration of said engine; electronic circuit means connected to said ignition system for generating an actuating voltage when said engine is operating above a predetermined speed; and switching means connected to said vacuum sensing switch means, said solenoid actuated valve means, and said electronic circuit means for operating said solenoid actuated valve means when receiving said actuating voltage simultaneously with said vacuum sensing switch means being closed by either said predetermined high or low vacuum conditions in said intake manifold; sand electronic circuit means including an inductor connected to the distributor breaker points of said ignition system, a first diode for clamping voltage transients from said inductor to ground, a first capacitor for AC coupling said voltage transients, a second capacitor for establishing a DC actuating voltage level, a second diode for coupling said first capacitor and said second capacitor, and a variable resistor connected between said first capacitor and ground for selectively adjusting said DC actuating voltage level.

12. The device of claim 11, wherein said relay means includes a Darlington transistor pair, and said second capacitor is connected to the trigger of said Darlington pair.

13. The device of claim 12, wherein both collectors of said Darlington pair are connected to said vacuum sensing switch means, and the emitter of said Darlington pair is connected to ground.

* * * * *